US012744423B2

(12) United States Patent
Aida et al.

(10) Patent No.: US 12,744,423 B2
(45) Date of Patent: Sep. 22, 2026

(54) ROTARY ELECTRICAL MACHINE

(71) Applicant: Mitsubishi Electric Corporation, Tokyo (JP)

(72) Inventors: Hiroshi Aida, Tokyo (JP); Kengo Fujimoto, Tokyo (JP); Shogo Hatano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 18/280,626

(22) PCT Filed: May 20, 2021

(86) PCT No.: PCT/JP2021/019161

§ 371 (c)(1),
(2) Date: Sep. 6, 2023

(87) PCT Pub. No.: WO2022/244185

PCT Pub. Date: Nov. 24, 2022

(65) Prior Publication Data

US 2024/0154483 A1 May 9, 2024

(51) Int. Cl.

*H02K 3/28* (2006.01)
*H02K 3/02* (2006.01)

(Continued)

(52) U.S. Cl.

CPC ............... *H02K 3/28* (2013.01); *H02K 3/345* (2013.01); *H02K 15/26* (2025.01); *H02K 3/02* (2013.01); *H02K 9/227* (2021.01)

(58) Field of Classification Search

CPC ............................. H02K 3/38; H02K 2203/09

(Continued)

(56) References Cited

U.S. PATENT DOCUMENTS

2005/0269895 A1 12/2005 Innami et al.
2010/0194214 A1* 8/2010 Takahashi ................ H02K 9/19 310/43

(Continued)

FOREIGN PATENT DOCUMENTS

EP 3 584 911 A1 12/2019
JP 2005-348522 A 12/2005

(Continued)

OTHER PUBLICATIONS

Office Action issued Mar. 12, 2024 in Japanese Application No. 2023-522116.

(Continued)

*Primary Examiner* — Oluseye Iwarere
*Assistant Examiner* — Minki Chang
(74) *Attorney, Agent, or Firm* — Sughrue Mion, PLLC

(57) ABSTRACT

A rotary electrical machine includes a stator and a rotor. The stator includes a plurality of iron cores that are annularly disposed, windings that are wound to each of the plurality of iron cores, connection terminals to which the windings are connected to, and molded members that partially cover the plurality of iron cores and the windings. The rotor rotates around an axis that coincides with a circular center of the plurality of iron cores. The molded members have resin portions that cover the plurality of iron cores and the windings, and a plurality of exposed terminal portions that expose the connection terminals.

11 Claims, 3 Drawing Sheets

(51) Int. Cl.

| | |
|---|---|
| ***H02K 3/34*** | (2006.01) |
| ***H02K 9/22*** | (2006.01) |
| ***H02K 15/26*** | (2025.01) |

(58) Field of Classification Search
USPC .................................................... 310/43, 412
See application file for complete search history.

(56) References Cited

U.S. PATENT DOCUMENTS

| | | | | |
|---|---|---|---|---|
| 2012/0286593 | A1 | 11/2012 | Yokogawa et al. | |
| 2018/0083516 | A1* | 3/2018 | Endo | H02K 5/128 |
| 2020/0028404 | A1* | 1/2020 | Yamagata | H02K 11/25 |
| 2022/0131449 | A1* | 4/2022 | Hongo | H02K 3/18 |
| 2023/0039361 | A1* | 2/2023 | Mawatari | H02K 3/34 |

FOREIGN PATENT DOCUMENTS

| | | | |
|---|---|---|---|
| JP | 4865704 | B2 | 2/2012 |
| JP | 2018-050361 | A | 3/2018 |
| JP | 2018-207582 | A | 12/2018 |
| JP | 2021-048688 | A | 3/2021 |
| WO | 2009/041172 | A2 | 4/2009 |

OTHER PUBLICATIONS

Extended European Search Report dated Jun. 11, 2024, issued in European Application No. 21940799.6.
International Search Report for PCT/JP2021/019161 dated Jul. 13, 2021 (PCT/ISA/210).
Communication dated Jun. 3, 2026, issued in European Application No. 21 940 799.6.
Communication dated Jun. 27, 2026, issued in Chinese Application No. 202180095598.5.

* cited by examiner

ROTARY ELECTRICAL MACHINE

CROSS REFERENCE TO RELATED APPLICATIONS

This application is a National Stage of International Application No. National Stage Entry of PCT/JP2021/019161 filed May 20, 2021.

TECHNICAL FIELD

The present disclosure relates to a rotary electrical machine.

BACKGROUND ART

A rotary electrical machine used for a vehicle electric power steering device is conventionally known.

In such a rotary electrical machine, from a heat dissipation and noise suppression point of view, a connection terminal of a stator and windings has a molded resin portion that is molded out of a resin or the like (for example, refer to Patent Documents 1 or 2).

Citation List

Patent Document

[Patent Document 1]: Japanese Patent No. 4865704

[Patent Document 2]: Japanese Unexamined Patent Application, First Publication No. 2005-348522

SUMMARY OF INVENTION

Problem to be Solved by the Invention

An electric power steering device is disposed in a location with relatively large changes in temperature in an inside of a vehicle. For example, there is a case where the electric power steering device is disposed inside an engine room of a vehicle. In such a case, a rotary electrical machine that composes a part of the electric power steering device is further exposed to high changes in temperature.

Thermal stresses, which are caused by differences in coefficients of a linear expansion of a molded resin portion of the rotary electrical machine, windings, and a connection terminal of the windings that change repeatedly, are generated due to the above changes in temperature. A problem of a service life of the rotary electrical machine being limited due to a fatigue that results from repeated generation of the thermal stresses exists.

The present disclosure has been made in order to address the problems above, and an object is to provide a rotary electrical machine in which it is possible to increase the service life thereof.

Means to Solve the Problem

A rotary electrical machine according to the present disclosure includes a stator and a rotor. The stator includes a plurality of iron cores that are annularly disposed, windings that are wound to each of the plurality of iron cores, connection terminals to which the windings are connected to, and molded members that partially cover the plurality of iron cores and the windings. The rotor rotates around an axis that coincides with a circular center of the plurality of iron cores. The molded members have resin portions that cover the plurality of iron cores and the windings, and a plurality of exposed terminal portions that expose the connection terminals.

Effects of the Invention

It is possible to increase a service life of a rotary electrical machine according to the rotary electrical machine of the present disclosure.

DESCRIPTION OF EMBODIMENTS

FIG. 1 to FIG. 7 are referred to when explaining a rotary electrical machine according to an embodiment.

Reference signs similar to one another are affixed to similar configuration components in FIG. 1 to FIG. 7. In explanations below, terms such as a "circumferential direction", a "radial direction", and an "axial direction" each correspond to the "circumferential direction", the "radial direction" and the "axial direction" of a stator of the rotary electrical machine. A term an "outside of the radial direction" means a direction towards an outside from a center of the stator in the radial direction. A term an "inside of the radial direction" means a direction towards the center from the outside of the stator in the radial direction.

First Embodiment

Figure 1:
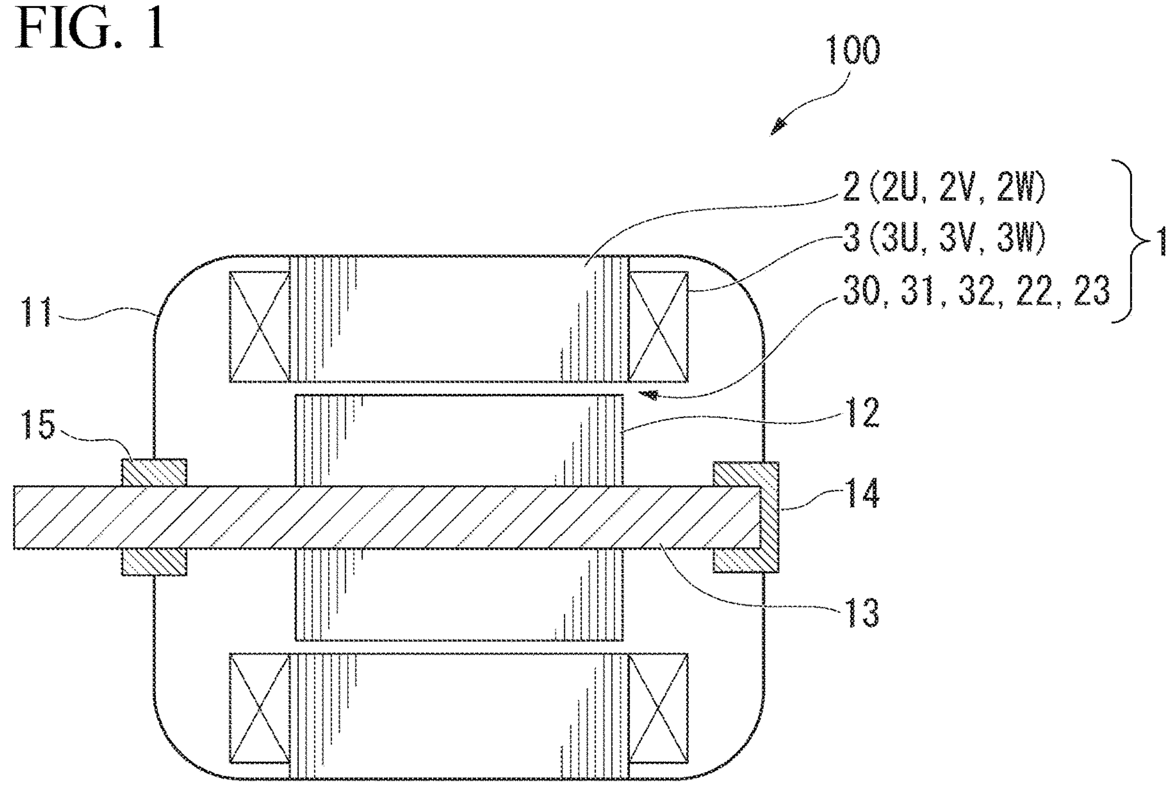
FIG. 1 is a schematic cross-section showing a structure of a rotary electrical machine according to a first embodiment.

FIG. 1 is a schematic cross-section showing a structure of a rotary electrical machine 100 according to a first embodiment.

The rotary electrical machine 100 is for example, applied to an electric power steering device mounted on a vehicle. The electric power steering device drives the rotary electrical machine 100 by a drive controller or the like. The drive controller controls a drive of the rotary electrical machine 100 based off of an output signal of a torque signal or the like that is output from the rotary electrical machine 100.

<Overall Configuration of Rotary Electrical Machine 100>

The rotary electrical machine 100 includes a frame 11, a stator 1, a rotor 12, a shaft 13 (rotation axis), and bearings 14 and 15.

The rotary electrical machine 100, for example, is a three phase brushless motor.

<Frame 11>

The frame 11, for example, is configured of a metallic material such as aluminum or the like that excels in the dissipation of heat generated by the rotary electrical machine 100. A shape of the frame 11 corresponds an outline of rotary electrical machine 100. The shape of the frame 11 as seen from the axial direction, is for example a cylindrical shape. The frame 11 is a case that surrounds material disposed inside of the rotary electrical machine 100. A stator 1, the rotor 12, and a part the shaft 13 are disposed on an inside of the frame 11.

The stator 1 is disposed on an inside surface of the frame 11 on the inside of the frame 11. In other words, the frame 11 mechanically holds the stator 1 on the inside of the frame 11. From the above, the frame 11 is configured to resist a torque in a case where torque is generated to the shaft 13 by the rotary electrical machine 100.

<Rotor 12, Shaft 13, Bearing 14 and 15>

The rotor 12 is fixed to a circumference of the shaft 13 and is disposed on the inside of the frame 11. The rotor 12 is configured of permanent magnets.

The shaft 13 is a rod-shaped material. A known metallic material is used as a material for shaft 13. A center of the shaft 13 and a center of the rotor 12 are coincident, as seen from the axial direction. The shaft 13 extends in the axial direction, in a manner where it extends towards the outside from the inside of the frame 11.

A first bearing 14 and a second bearing 15 are positioned on both ends of the frame 11. The first bearing 14 and the second bearing 15 rotatably support the shaft 13. The first bearing 14 rotatably supports the shaft 13 on the inside of the frame 11. The shaft 13 penetrates the second bearing 15. The shaft 13 that extends from the second bearing 15 to the outside of the frame 11 is the output shaft of the rotary electrical machine 100.

<Stator 1>

Figure 2:
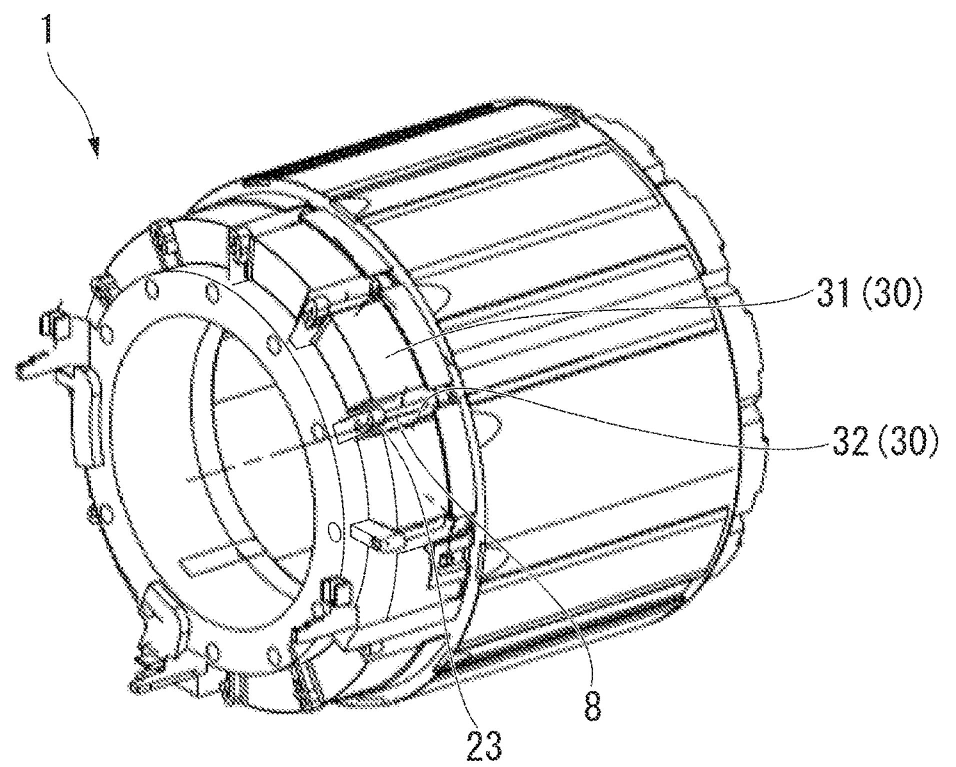
FIG. 2 is a perspective view showing a structure of a stator that configures the rotary electrical machine according to the first embodiment.
Figure 3:
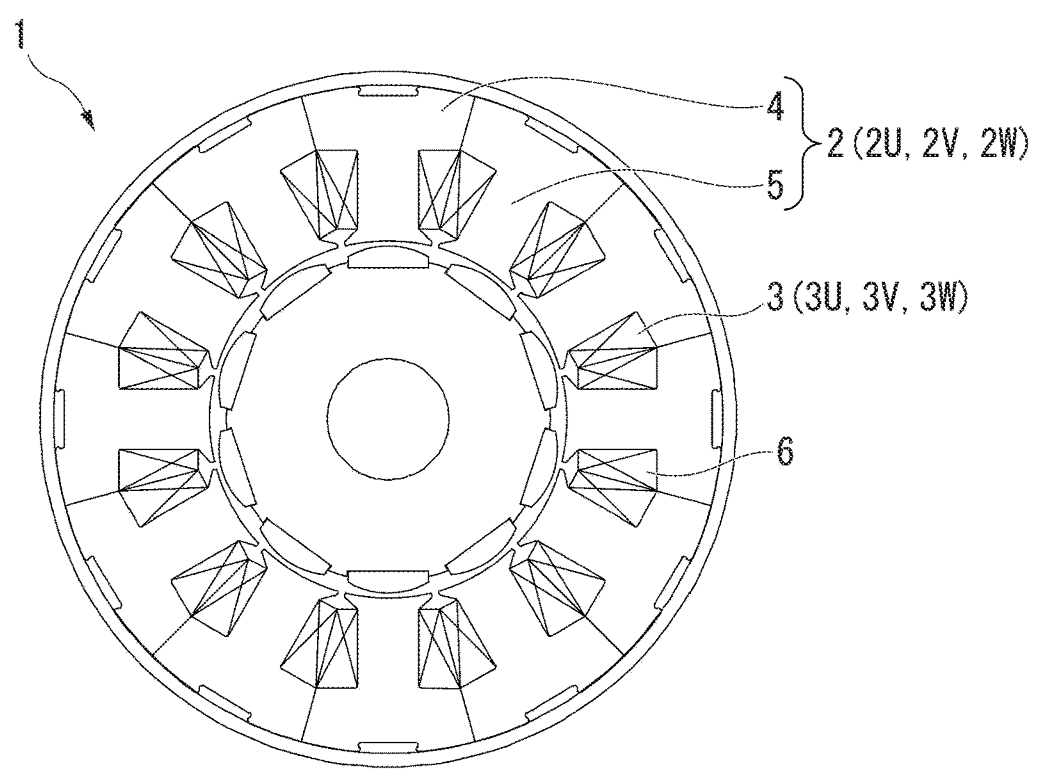
FIG. 3 is a cross-sectional view showing a structure of the stator that configures the rotary electrical machine according to the first embodiment.
Figure 4:
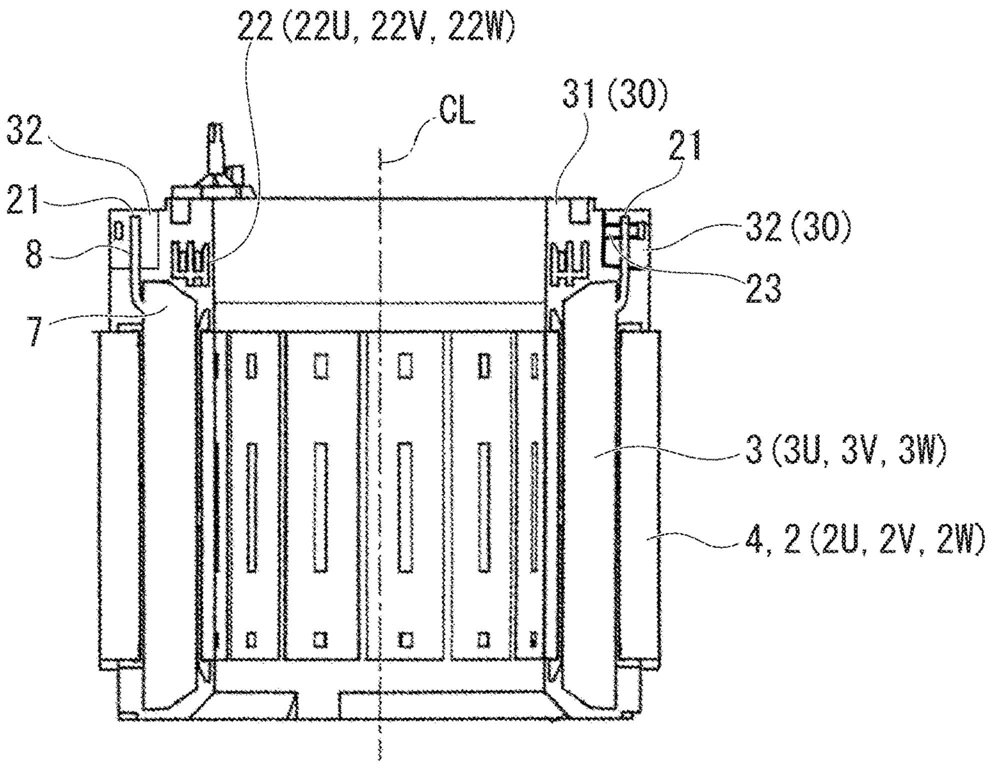
FIG. 4 is a cross-sectional view showing a structure of the stator that configures the rotary electrical machine according to the first embodiment.

FIG. 2 is a perspective view showing a structure of the stator 1 that configures the rotary electrical machine 100 according to the first embodiment. FIG. 3 is a cross-sectional view showing a structure of the stator 1 that configures the rotary electrical machine 100 according to the first embodiment as seen from the axial direction. FIG. 4 is a cross-sectional view showing a structure of the stator that configures the rotary electrical machine 100 according to the first embodiment. The cross-sectional view includes a center line CL of the rotary electrical machine 100.

In FIG. 2 and in FIG. 4, the frame 11, the rotor 12, the shaft 13, the first bearing 14 and the second bearing 15 are omitted.

As shown in FIG. 1 to FIG. 4, the stator 1 includes a plurality of iron cores 2 that are annularly disposed, windings 3 that are wound to each of the plurality of iron cores 2, winding holders 22, terminal hooks 23, and molded members 30.

A center of the ring configured by the plurality of iron cores 2 that are annularly disposed corresponds to the position of the center line CL shown in FIG. 4. For the above reason, in the explanations below, there are cases where the center of the ring the plurality of iron cores 2 are disposed on is referred to as a "circular center CL".

<Iron Cores 2>

Each of the plurality of iron cores 2 have back yokes 4 and teeth 5. A known metallic material is used as the material of the iron cores 2.

The back yokes 4 form an outside portion of the iron cores 2 on the outside of the radial direction. The teeth 5 extend towards an inside of the radial direction from an inside of the back yokes 4. In other words, the teeth 5 form inside portions of the iron cores 2. A width (arc width) of a tooth of the teeth 5 is smaller than a width (arc width) of a back yoke of the back yokes 4 in the circumferential direction. For this reason, a slot of slots 6 is formed in a space between a pair of teeth 5 that are adjacent to one another in the plurality of iron cores 2 that are annularly disposed. As is mentioned later on, the windings 3 that are wound to the teeth 5 are disposed in the slots 6.

The plurality of iron cores 2 are for example disposed in an annular fashion along the circumferential direction of the stator 1. In the plurality of iron cores 2, a coupling portion for example that is not shown is provided in a space between a pair of iron cores 2 that are adjacent to one another. The coupling portion couples the pair of iron cores 2 that are adjacent to one another, and determines the positions of the plurality of iron cores 2 in the entirety of the stator 1.

The circular center CL of the plurality of iron cores 2 is coincident with the centers of the shaft 13 and the rotor 12. As such, the shaft 13 and the rotor 12 rotate so as to coincide with the circular center CL, due to an effect of magnetic forces generated between the iron cores 2 and the rotor 12.

As an example of a structure of the coupling portion, it is possible to mention a welding structure where a pair of iron cores 2 that are adjacent to one another are joined together by welding. In such a case, a pair of the back yokes 4 that face one another along the circumferential direction are coupled together via welding, in a structure where the plurality of iron cores 2 are annularly disposed. The above however is not limited to such a welding structure, and a mating structure where a recessed portion and a protruding portion are mated may be adopted.

An example of the mating structure is explained. The recessed portion is provided on an end surface out of two end surfaces of the back yokes 4 of the iron cores 2 in the circumferential direction, and the protruding portion is provided on the other end surface of the two end surfaces. In the mating structure, the pair of iron cores 2 that are adjacent to one another are coupled so that the recessed portion and the protruding portion mate with one another.

It is possible to combine the aforementioned welding structure with the above mating structure as a structure of the coupling portion.

A number of the iron cores 2 that are annularly disposed is twelve in the first embodiment. When the rotary electrical machine 100 configures a three phase brushless motor, the number of the iron cores 2 is not limited to twelve, and may be a number greater than or equal to 13, or may be a number less than or equal to 11.

The plurality of iron cores 2 are configured of a U phase iron core 2U, a V phase iron core 2V, and a W phase iron core 2W that correspond to each of a U phase, a V phase and a W phase of a three phase alternating current. In the explanation below, there are cases where the U phase iron core 2U, the V phase iron core 2V, and the W phase iron core 2W are simply referred to as the iron cores 2.

<Windings 3>

A known metallic material is used as a material for the windings 3.

The windings 3 are wound around each of the teeth 5 of the plurality of iron cores 2. The windings 3 are wires that connect winding end portions 7 and terminal wires 8. The winding end portions 7 and the terminal wires 8 are the equivalent of a part of the windings 3 that are lead-out wires.

The winding end portions 7 extend towards the axial direction from the windings 3 wound around the teeth 5. The winding end portions 7 are exposed to the outside of the iron cores 2 from the iron cores 2. In other words, exposed parts of the windings 3 that are exposed from the iron cores 2 are the winding end portions 7.

The terminal wires 8 are the parts that are pulled out from the stator 1, to the outside of the stator 1. The terminal wires 8 expose from molded members 30.

The windings 3 are configured of U phase windings 3U, V phase windings 3V, and W phase windings 3W that correspond to each of the U phase, the V phase and the W phase of a three phase alternating current. Each of the U phase windings 3U, the V phase windings 3V, and the W phase windings 3W are respectively wound around the teeth 5 of the U phase iron core 2U, the teeth 5 of the V phase iron core 2V, and the teeth 5 of the W phase iron core 2W respectively.

In the explanations below, there are cases where the U phase windings 3U, the V phase windings 3V, and the W phase windings 3W are simply referred to as the windings 3.

The U phase windings 3U, the V phase windings 3V, and the W phase windings 3W are wired by a "A connection" (delta connection) or a "Y connection" (star connection). As a circuit that includes the U phase windings 3U, the V phase windings 3V, and the W phase windings 3W and a neutral point, a known circuit configuration is adopted.

As shown in FIG. 4, the U phase windings 3U, the V phase windings 3V, and the W phase windings 3W are connected at connection terminals 21. The windings 3 wound around the teeth 5 of the iron cores 2 are electrically and mechanically connected in the connection terminals 21.

<Winding Holders 22>

Winding holders 22 are for example, members that are attached to the back yokes 4 of each of the plurality of iron cores 2. The winding holders 22 hold the wires that are not wound around the teeth 5 in the stator 1. In other words, the winding holders 22 hold the lead-out wires that have been pulled out towards the outside of the teeth 5 from the windings 3 that are wound around the teeth 5.

For example, a known insulating material having electric insulation is used as a material for the winding holders 22.

The winding holders 22 for example, have a U phase groove 22U, a V phase groove 22V, and a W phase grooves 22W that correspond to each of the U phase, the V phase and the W phase of a three phase alternating current. The lead-out wires that correspond to each of the U phase windings 3U, the V phase windings 3V, and the W phase windings 3W are disposed in each of the U phase groove 22U, the V phase groove 22V, and the W phase grooves 22W.

One winding holder of the winding holders 22 is attached to one iron core of the iron cores 2. Each of the U phase groove 22U, the V phase groove 22V, and the W phase grooves 22W that are provided in the above winding holders 22 are arc grooves that extend along the circumferential direction. As shown in FIG. 3, by annularly disposing the plurality of iron cores 2 the arc grooves that are adjacent to one another are joined. In other words, the winding holders 22 that are adjacent to one another are joined. Therefore, the U phase groove 22U, the V phase groove 22V, and the W phase grooves 22W extend in the circumferential direction in the entirety of the stator 1.

By disposing the lead-out wires in the U phase groove 22U, the V phase groove 22V, and the W phase grooves 22W, the winding holders 22 hold the lead-out wires.

<Terminal Hooks 23>

The terminal hooks 23 are for example, elements that are attached to the back yokes 4 of the iron cores 2. For example, a known insulating material having electric insulation is used as a material for the terminal hooks 23. The terminal hooks 23 may be formed integrally with the winding holders 22, or separately from the winding holders 22.

The terminal hooks 23 are disposed in a position that corresponds with the terminal wires 8 and the connection terminals 21. The terminal hooks 23 function as positioning members that determine the positions of the terminal wires 8 and the connection terminals 21. As the terminal hooks 23 for example, it is possible to mention clips that utilize elasticity to hold the terminal wires 8 and the connection terminals 21. The structure of the terminal hooks 23 however, is not limited to the above mentioned clips.

<Molded Members 30>

As shown in FIG. 4, the molded members 30 have resin portions 31 and a plurality of exposed terminal portions 32. The molded members 30 are molded with a mold using known methods, and are provided in the stator 1 so as to roughly surround the entirety of the stator 1. However, as is mentioned later on, it is possible for the molded members 30 to have a configuration such that members of the terminal wires 8 and the connection terminals 21 or the like are exposed due to the exposed terminal portions 32, and the molded members 30 are not configured to completely cover the stator 1.

<Resin Portions 31>

The resin portions 31 cover the windings 3 wound around the teeth 5, the winding end portions 7, and the winding holders 22. The resin portions 31 are inserted into the space between the back yokes 4 of the iron cores 2 that are adjacent to one another. In other words, the resin portions 31 function as fixing portions that fix the plurality of iron cores 2 that are annularly disposed.

As a resin material that configures the resin portions 31 for example, nylon resin of PA66 or the like may be used. From the above, it is possible to realize the resin portions 31 that while being low cost, have high coefficients of thermal expansion. As the resin portions 31 for example, a known resin material such as epoxy resin or the like may be used.

<Exposed Terminal Portions 32>

The exposed terminal portions 32 expose the terminal wires 8, the connection terminals 21, and the terminal hooks 23 to the outside of the molded members 30.

The positions in which each of the plurality of exposed terminal portions 32 are formed correspond with the positions of the terminal wires 8 and the positions of the connection terminals 21. Unlike the resin portions 31, the exposed terminal portions 32 are parts that are not formed of resin. For such a reason, it is possible to refer to the exposed terminal portions 32 as the "non-molded portions". It is possible to refer to the exposed terminal portions 32 as the "recessed portion" or the "step portion" formed in the resin portions 31. The plurality of the exposed terminal portions 32 are formed in the molded members 30 at equal intervals along the circumferential direction of the stator 1.

The molded members 30 are formed so as to partially cover an outer circumference of the stator 1 along the circumferential direction of the stator 1. When forming the molded members 30, the resin portions 31 and the exposed terminal portions 32 are formed in a state where the windings 3 are wound around the teeth 5, and in a state where the connection terminals 21 are held by the terminal hooks 23.

Next, effects of the rotary electrical machine 100 that contains the stator 1 having the configuration mentioned above is explained, as compared to a conventional rotary electrical machine.

In the conventional rotary electrical machine, a structure where the entire stator is molded out of resin is adopted to suppress a generation of vibration in the stator, to improve overall mechanical strength of the stator, to suppress noise generated from the rotary electrical machine, and to improve heat dissipation of the rotary electrical machine. Further, a structure where not only the entire stator is molded out of resin, but connection terminals having three phase windings connected thereto that are also molded out of resin is also adopted in the conventional rotary electrical machine.

As in the above configuration of the conventional rotary electrical machine, differences in the coefficients of linear expansion of metallic materials and molded resin materials exist, due to the differences between the metallic materials that form the windings and the connection terminals, and the resin material used for the mold. When the rotary electrical machine is exposed to large changes in temperature, thermal stresses are repeatedly generated between the windings and the resin, or, between the connection terminals and the resin due to the differences in the coefficients of linear expansion. In such locations where the thermal stresses are generated, fatigue is generated, and a problem of a service life of the rotary electrical machine being limited exists.

Contrary to such a conventional rotary electrical machine, the rotary electrical machine 100 according to the first embodiment includes the molded members 30 which have the exposed terminal portions 32. The terminal wires 8 and the connection terminals 21 are exposed in the exposed terminal portions 32. In other words, the terminal wires 8 and the connection terminals 21 are neither covered by the resin portions 31, nor are the terminal wires 8 and the connection terminals 21 in contact with the resin portions 31.

Therefore, since the terminal wires 8 and the resin portions 31 are not in contact, it is possible to suppress the generation of thermal stresses between the terminal wires 8 and the resin portions 31. Similarly, since the connection terminals 21 and the resin portions 31 are not in contact, it is possible to suppress the generation of thermal stresses between the connection terminals 21 and the resin portions 31. In other words, the fatigue that is generated in the conventional rotary electrical machine does not occur between the terminal wires 8 and the resin portions 31, and between the connection terminals 21 and the resin portions 31. According to the first embodiment, it is possible to increase the service life of the rotary electrical machine 100.

The rotary electrical machine 100 according to the first embodiment includes the terminal hooks 23 that determine the positions of the terminal wires 8 and the connection terminals 21. For the above reason, it is possible to preserve a positioning accuracy in which the terminal wires 8 and the connection terminals 21 are disposed. In other words, since the terminal wires 8 and the connection terminals 21 are positioned with high accuracy by the terminal hooks 23, even if the molded members 30 deform due to heat shrinkage that accompanies formation of the molded members 30, it is possible to suppress misalignment of the terminal wires 8 and the connection terminals 21. Therefore, there is no need to adjust the positions of the terminal wires 8 and the connection terminals 21, and it is possible to improve the productivity of the rotary electrical machine 100.

The rotary electrical machine 100 according to the first embodiment includes the winding holders 22 that have the U phase groove 22U, the V phase groove 22V, and the W phase grooves 22W. The U phase groove 22U, the V phase groove 22V, and the W phase grooves 22W extend in the circumferential direction in the entirety of the stator 1. From the above, it is possible to improve the positioning accuracy of the windings 3 and the connection terminals 21 by disposing the lead-out wires of the windings 3 in each of the U phase groove 22U, the V phase groove 22V, and the W phase grooves 22W. By forming the molded members 30 using the mold, it is also possible to easily conduct the formation of the molded members 30 by molding, in a state where the positioning accuracy of the windings 3 and the connection terminals 21 is preserved by the winding holders 22. As a molding method, for example, mold clamping may be used.

The exposed terminal portions 32 are formed in the molded members 30 at equal intervals along the circumferential direction of the stator 1. Therefore, intervals of a plurality of exposed terminal portions 32 are preserved equally in the in the circumferential direction of the molded members 30, even if the molded members 30 deform due to the heat shrinkage that accompanies formation of the molded members 30. In other words, it is possible to improve the formability of the molded members 30, and it is possible to improve the productivity of the stator 1.

It is possible to make the thermal stresses generated between members covered by the resin portions 31 and the resin portions 31 become uniform by providing the plurality of exposed terminal portions 32 at equal intervals along the circumferential direction of the molded members 30. As a result, it is possible to increase service life of the rotary electrical machine 100.

It is also possible to align the position of the circular center CL formed by the plurality of iron cores 2 that are annularly disposed with the position of a center of gravity of the stator 1 by providing the plurality of exposed terminal portions 32 at equal intervals along the circumferential direction of the molded members 30. As a result, an effect of suppressing vibration generation (vibration resistance) of the rotary electrical machine 100 is obtainable in a state where the shaft 13 rotates due to a drive of the rotary electrical machine 100.

By the molded members 30 having both the resin portions 31 and the exposed terminal portions 32, it is possible to make a thickness of the resin portions 31 in the radial direction partially smaller. As a result, it is possible to relieve stresses that are generated in the space between the windings 3 and the resin portions 31. Since the exposed terminal portions 32 are recessed or step portions formed in the resin portions 31, the amount of the resin material used to configure the molded members 30 is decreased, contributing to weight reduction of the stator 1. Since the heat generated by the stator 1 is dissipated by the resin portions 31, it is possible to insure the heat dissipation of the stator 1.

The positions in which the exposed terminal portions 32 are formed in the molded members 30 are equivalent to the portions where stresses concentrate in the conventional structure, in which the entirety of the stator is molded out of resin. In other words, as compared to the structure of the conventional rotary electrical machine, the resin portions 31 are not formed at portions where the stresses concentrate in the rotary electrical machine 100 according to the first embodiment, and instead, the exposed terminal portions 32 are positioned at the portions where the stresses concentrate. Therefore, in the in the rotary electrical machine 100, it becomes difficult to generate stress concentration which is generated in the conventional rotary electrical machine. Therefore, in the exposed terminal portions 32, it is possible to relieve the thermal stresses that are generated in the windings 3 and the connection terminals 21.

Second Embodiment

A rotary electrical machine according to a second embodiment is explained with reference to FIG. 5.

Figure 5:
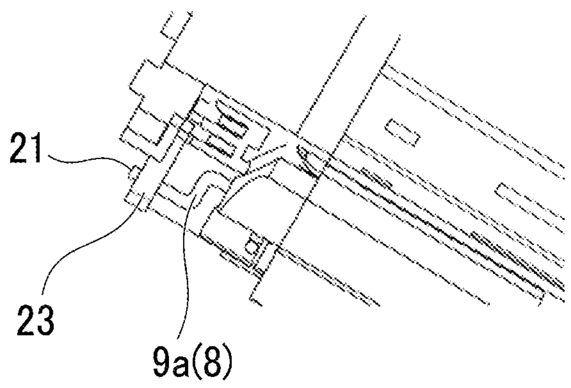
FIG. 5 is a partial cross-sectional view showing a structure of a terminal wire out of terminal wires that configure the rotary electrical machine according to a second embodiment.

FIG. 5 is a partial cross-sectional view showing a structure of a terminal wire out of the terminal wires 8 that configures the rotary electrical machine according to the second embodiment.

Explanations of similar configurations in the second embodiment and the first embodiment are omitted. The second embodiment differs from the first embodiment in the point of differing structures of the terminal wires 8. Below, the point of difference between the first embodiment and the second embodiment is mainly explained.

As shown in FIG. 5, in the in the rotary electrical machine according to the second embodiment, the terminal wires 8 that are disposed in the exposed terminal portions 32 have bent portions 9*a*. The bent portions 9*a* are formed in the middle of the terminal wires 8 that extend in the axial direction. The bent portions 9*a* have a crank shape. It is possible to refer to the bent portions 9*a* as the "stress concentration absorbing portion" that absorb stresses that are generated in the terminal wires 8.

A case where thermal stresses are generated in the terminal wires 8 in the rotary electrical machine according to the second embodiment is explained below. In the terminal wires 8 that have the bent portions 9*a*, even if stresses that contract and expand in the axial direction are generated in the terminal wires 8, such stresses are absorbed by the bent portions 9*a*. For such a reason, it is possible to suppress a deformation in the axial direction of the terminal wires 8.

Similarly, even when stresses that cause the terminal wires 8 to deform in the radial direction and in the circumferential direction are generated in the terminal wires 8, such stresses are absorbed by the bent portions 9*a*. For such a reason, it is possible to suppress the deformation in the radial direction and the circumferential direction of the terminal wires 8.

In the rotary electrical machine according to the second embodiment, effects similar to the effects mentioned in the above first embodiment are obtainable. Even when stresses form in the terminal wires 8, since the bent portions 9*a* absorb the stresses of the terminal wires 8, the stresses at the terminal wires 8 are relieved, and it is possible to improve the service life of the rotary electrical machine.

Modification Example

Figure 6:
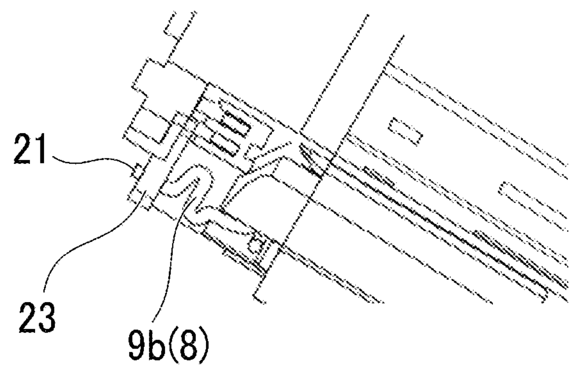
FIG. 6 is a partial cross-sectional view showing a structure of a terminal wire out of terminal wires that configure the rotary electrical machine according to a modification example of the second embodiment.

FIG. 6 is a partial cross-sectional view showing a structure of a terminal wire out of the terminal wires 8 that configure the rotary electrical machine according to a modification example of the second embodiment.

Bent portions explained in the second embodiment are not limited to the crank shape in FIG. 5. As shown in FIG. 6, the terminal wires 8 may have roughly S shaped bent portions 9*b* in place of the bent portions 9*a* shown in FIG. 5. It is possible to refer to the bent portions 9*b* as the "stress concentration absorbing portion" that absorb stresses that are generated in the terminal wires 8.

In such a case, effects similar to the effects mentioned in the above second embodiment are obtainable.

Third Embodiment

A rotary electrical machine according to a third embodiment is explained with reference to FIG. 7.

Figure 7:
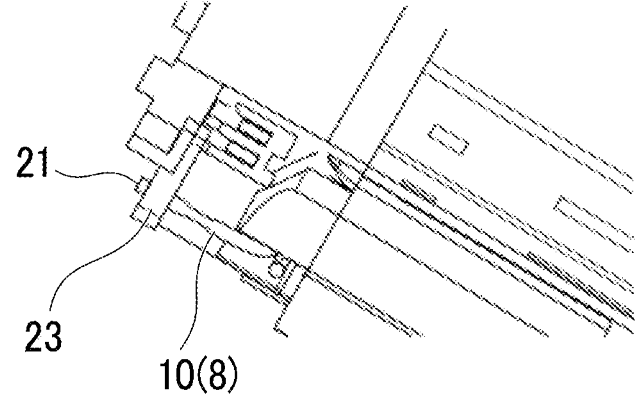
FIG. 7 is a partial cross-sectional view showing a structure of a terminal wire out of terminal wires that configures the rotary electrical machine according to a third embodiment.

FIG. 7 is a partial cross-sectional view showing a structure of a terminal wire out of terminal wires 8 that configures the rotary electrical machine according to the third embodiment.

Explanations of similar configurations in the third embodiment and the first embodiment are omitted. The third embodiment differs from the first embodiment in the point of differing structures of the terminal wires 8. Below, the point of difference between the first embodiment and the third embodiment is mainly explained.

As shown in FIG. 7, in the rotary electrical machine according to the third embodiment, the terminal wires 8 that are disposed in the exposed terminal portions 32 include thin wire portions 10 that have smaller diameters than the terminal wires 8. The thin wire portions 10 are formed in the middle of the terminal wires 8 that extend in the axial direction. The thin wire portions 10 may be referred to as a "deformation promoting portion" that promotes the deformation of the thin wire portions 10.

A case where thermal stresses are generated in the terminal wires 8 in the rotary electrical machine according to the third embodiment is explained below. Since the terminal wires 8 have the thin wire portions 10, the thin wire portions 10 deform positively along with stresses that are generated in the terminal wires 8. For such a reason, the stresses that are generated in positions of portions that have a larger diameter than the thin wire portions 10 are relieved due to the deformation of the thin wire portions 10.

In the rotary electrical machine according to the third embodiment, effects similar to the effects mentioned in the above first embodiment are obtainable. Even when stresses form in the terminal wires 8, due to the deformation of the thin wire portions 10, the stresses at the terminal wires 8 are relieved, and it is possible to improve the service life of the rotary electrical machine.

REFERENCE SIGNS LIST

1 . . . Stator 2 . . . Iron Cores 2U . . . U Phase Iron Core 2V . . . V Phase Iron Core 2W . . . W Phase Iron Core 3 . . . Windings 3U . . . U Phase Windings 3V . . . V Phase Windings 3W . . . W Phase Windings 4 . . . Back Yokes 5 . . . Teeth 6 . . . Slots 7 . . . Winding End Portions 8 . . . Terminal Wires 9A, 9*b* . . . Bent Portions 10 . . . Thin Wire Portions 11 . . . Frame 12 . . . Rotor 13 . . . Shaft 14 . . . First Bearing (Bearing) 15 . . . Second Bearing (Bearing) 21 . . . Connection Terminals 22 . . . Winding Holders 22U . . . U Phase Groove 22V . . . V Phase Groove 22W . . . W Phase Grooves 23 . . . Terminal Hooks 30 . . . Molded Members 31 . . . Resin Portions 32 . . . Exposed Terminal Portions 100 . . . Rotary Electrical Machine

The invention claimed is:

1. A rotary electrical machine comprising:

a stator that includes a plurality of iron cores that are annularly disposed; windings that are wound to each of the plurality of iron cores; connection terminals to which the windings are connected to; molded members that partially cover the plurality of iron cores and the windings, and fix the plurality of winding cores together; and a rotor that rotates around an axis that coincides with a circular center of the plurality of iron cores, wherein the molded members have resin portions that cover the plurality of iron cores and the windings, and a plurality of exposed terminal portions that expose the connection terminals, the windings have terminal wires that connect to the windings;

the terminal wires are positioned in each of the exposed terminal portions;

the terminal wires have stress absorbing portions that absorb stresses generated in the terminal wires, and the stress absorbing portions have an S shape, wherein the S shape has:

a first wire portion that protrudes towards an orthogonal direction that is orthogonal to an axial direction, and a second wire protrusion that protrudes to an opposite direction of the first protrusion, a first end of the first wire protrusion and a first end of the second wire protrusion are connected to one another, and the first and the second wire portions are configured to absorb stresses generated in the terminal wires.

2. The rotary electrical machine according to claim 1 comprising:

winding holders that are attached to each of the plurality of iron cores; wherein the winding holders have arc grooves that extend along the circumferential direction of the stator; and a part of the windings is disposed in the arc grooves.

3. The rotary electrical machine according to claim 1, wherein:

the plurality of the exposed terminal portions are formed in the molded members at equal intervals along the circumferential direction of the stator.

4. The rotary electrical machine according to claim 1, wherein the windings have terminal wires that connect to the windings;

the terminal wires are positioned in each of the exposed terminal portions; and the terminal wires have deformation promoting portions that deform due to the stresses generated in the terminal wires.

5. The rotary electrical machine according to claim 1, wherein

PA66 is used as a material of the resin portions.

6. The rotary electrical machine according to claim 1 comprising:

winding holders that are attached to each of the plurality of iron cores; wherein the winding holders have arc grooves that extend along the circumferential direction of the stator; and a part of the windings is disposed in the arc grooves.

7. A rotary electrical machine comprising:

a stator that includes a plurality of iron cores that are annularly disposed; windings that are wound to each of the plurality of iron cores; connection terminals to which the windings are connected to; molded members that partially cover the plurality of iron cores and the windings; and a rotor that rotates around an axis that coincides with a circular center of the plurality of iron cores, wherein the molded members have resin portions that cover the plurality of iron cores and the windings, and a plurality of exposed terminal portions that expose the connection terminals, and the windings have terminal wires that connect to the windings and the terminal wires are positioned in each of the exposed terminal portions;

winding holders that are attached to each of the plurality of iron cores; wherein the winding holders have arc grooves that extend along the circumferential direction of the stator;

a part of the windings is disposed in the arc grooves; and the molded portions cover the winding holders.

8. The rotary electrical machine according to claim 7, wherein:

the plurality of the exposed terminal portions are formed in the molded members at equal intervals along the circumferential direction of the stator.

9. The rotary electrical machine according to claim 7, wherein the terminal wires have stress absorbing portions that absorb stresses generated in the terminal wires, and the stress absorbing portions have an S shape, wherein the S shape has a first wire portion that protrudes towards an orthogonal direction that is orthogonal to an axial direction, a second wire protrusion that protrudes to an opposite direction of the first protrusion, a first end of the first wire protrusion and a first end of the second wire protrusion are connected to one another, and the first and the second wire portions are configured to absorb stresses generated in the terminal wires.

10. The rotary electrical machine according to claim 7, wherein

PA66 is used as a material of the resin portions.

11. A rotary electrical machine comprising:

a stator that includes a plurality of iron cores that are annularly disposed; windings that are wound to each of the plurality of iron cores; connection terminals to which the windings are connected to; molded members that partially cover the plurality of iron cores and the windings; and a rotor that rotates around an axis that coincides with a circular center of the plurality of iron cores, wherein the molded members have resin portions that cover the plurality of iron cores and the windings, and a plurality of exposed terminal portions that expose the connection terminals;

winding holders that are attached to each of the plurality of iron cores; wherein the winding holders have arc grooves that extend along the circumferential direction of the stator;

a part of the windings is disposed in the arc grooves; and the molded portions cover the winding holders, wherein the windings have terminal wires that connect to the windings;

the terminal wires are positioned in each of the exposed terminal portions; and the terminal wires have deformation promoting portions that deform due to the stresses generated in the terminal wires.

* * * * *